(12) United States Patent
Sandner et al.

(10) Patent No.: US 7,490,947 B2
(45) Date of Patent: Feb. 17, 2009

(54) MICROOPTIC REFLECTING COMPONENT

(75) Inventors: Thilo Sandner, Dresden (DE); Wolfram Pufe, Dresden (DE); Harald Schenk, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 28 days.

(21) Appl. No.: 11/640,497

(22) Filed: Dec. 18, 2006

(65) Prior Publication Data

US 2007/0165297 A1 Jul. 19, 2007

(30) Foreign Application Priority Data

Dec. 16, 2005 (DE) .................. 10 2005 063 254

(51) Int. Cl.
*G02B 5/08* (2006.01)
(52) U.S. Cl. ...................................... 359/846
(58) Field of Classification Search ......... 359/223–226, 359/290–292, 871, 872, 846
See application file for complete search history.

(56) References Cited

U.S. PATENT DOCUMENTS 4,783,155 A 11/1988 Imataki et al.
6,840,642 B2 * 1/2005 Ishikawa et al. ............ 359/872

2005/0063038 A1 3/2005 Filhol

FOREIGN PATENT DOCUMENTS

DE 3424068 5/2002
EP 1351087 A2 10/2003
EP 1443016 A2 8/2004
WO WO2004/099629 11/2004

OTHER PUBLICATIONS

Thermisch aktivierte Bauelement für die adaptive Optik, Forschungsprogramm Optische Technologien der Landesstiftung Baden-Würtemmbeg, p. 56.

* cited by examiner

*Primary Examiner*—Euncha P Cherry
(74) *Attorney, Agent, or Firm*—Jacobson Holman PLLC

(57) ABSTRACT

The invention relates to active microoptic reflecting components for adapting or changing the focal length or focal position in optical systems. It is the object of the invention to make available a miniaturized reflecting microoptic component for focusing or defocusing incident electromagnetic radiation, with which a variation in the focal distance can be achieved simply and at low cost. On the component according to the invention there is an elastically deformably membrane which is formed at least with one reflecting layer comprising a first material or material mixture and at least with one further layer or substrate which is formed from a second material or material mixture. First and second materials or material mixtures have thermal coefficients of expansion which deviate from each other. In addition a heating or temperature control mechanism is present.

18 Claims, 9 Drawing Sheets

MICROOPTIC REFLECTING COMPONENT

BACKGROUND OF THE INVENTION (1) Field of the Invention

The invention relates to active microoptic reflecting components for adapting or changing the focal distance or focal position in optical systems.

(2) Description of Related Art

In the optical detection of measuring variables or data, the position of the focal point must in many cases be varied or the lack of a variation option restricts the performance of the measuring-detecting system. For example, the confocal measuring principle may be cited in the following, in which a variation in the focal position is used, and reading of barcodes with a laser scanner in which the lack of a focus variation leads to a restriction in performance.

a) Measuring system which is based on a variation of the focal position: the confocal measuring principle is used principally for measuring the surface topology of an object. The focal point must be varied perpendicular to the surface (z direction) for this purpose. This is frequently achieved such that the optical path length from the point light source to the object is changed continuously or progressively. Due to the lenses which are disposed suitably in the optical beam path, the position of the focal point is consequently varied.

b) Optical system in which the lack of a focal variation leads to a restriction in performance: when reading barcodes the position of the focal point determines the location at which barcodes with the highest density can be read. The greater the spacing between barcode and focal point, the smaller is the resolution of the scanner. Barcodes of high density can therefore only be detected within a very restricted reading distance. The performance of the scanner is hence limited.

In order to vary the focal distance or position of the focal point with the boundary condition that both the measuring system and the object to be measured/detected are not moved, there are two approaches in principle.

The first approach is based on extending the optical path length between light source and outlet aperture of the light beam from the measuring system. For this purpose, in the simplest case a planar mirror is moved perpendicularly to the incident light beam. The movement of the mirror requires a drive which can be based for example on an electromagnetic principle. In the case of precision-engineering production of such a mirror with a drive, the result is relatively large constructional volumes and high costs. For mobile applications such as scanner guns, this method is thus not suitable. Micromechanically manufactured translatory mirrors are characterised by relatively small movements so that the achievable optical path length changes are comparatively small. In order to convert this small path length change into a significant change of position of the focal point, a complex lens system would be required which is very intolerant in relation to position change of the optical components (tolerances in construction, thermally induced position changes etc.).

The second approach is based on using deformable mirrors. The deformation is thereby chosen such that a hollow mirror with an adjustable focal distance is produced. The mirror deformation is achieved via actuators which are situated underneath the mirror. In the case of systems manufactured using precision engineering, as are used in astronomy for adaptive-optical systems, piezoactuators are used in general. Such systems are very complex, expensive and have a large volume. Micromechanically manufactured, deformable mirrors are smaller and cheaper. Here, the static or quasistatic deformation is generally generated by electrostatic forces. Either arrays comprising individual, translatory and possibly additionally rotationally adjustable mirrors or membrane mirrors are used here. The arrays have the disadvantage that, as a result of segmentation of the reflective surface, diffraction effects occur which significantly reduce the beam quality. Membrane mirrors comprise a continuous mirror membrane which is generally deformed by actuators which are disposed in an array under the membrane. Almost without exception, electrostatic or piezoelectric actuators are used for this purpose. Both variants have the disadvantage that high electrical voltages are required for deformation of the membrane.

BRIEF SUMMARY OF THE INVENTION

It is the object of the invention to make available a miniaturised reflecting microoptic component for focusing or defocusing incident electromagnetic radiation, with which a variation in the focal distance can be achieved simply and at low cost.

The invention relates to a deformable "membrane mirror" using thermally induced mechanical stresses. In the simplest case, a membrane is used which is formed with at least two layers or with one layer and a substrate, which are formed from materials or material mixtures with different thermal coefficients of expansion (bimorph). It is assumed in the following that the layer system has a planar flat surface at a prescribed temperature, e.g. room temperature. Upon a temperature change which can be achieved by a heating or temperature control mechanism, the two layers or the layer and substrate expand to a greatly differing degree, which leads to a change in the curvature of the membrane. The temperature change can be achieved either via an integrated or external electric heating mechanism. This is however also possible with electromagnetic radiation. As a function of the heating power, the ambient temperature and the thermal coupling of the membrane to the environment, the curvature thereof can thus be adjusted. At least within a limited area of the membrane, the resulting deformation can be described as spherical with very good approximation. This part of the membrane can act optically as a concave or convex mirror and thus be used in optical systems as an active element for changing the focal distance.

In the case of the invention, the membrane, as already cited, can be formed with at least two layers comprising different materials or material mixtures with respectively different thermal coefficients of expansion. However a differently configured composite of these different materials or material mixtures can also be used, merely one layer being used and the further material or material mixture then being joined, deviating from a layer form, to this one layer on one side, preferably integrally.

Upon heating the membrane with a reflecting layer which is formed from a material or material mixture, the thermal coefficient of expansion of which is lower than that of a second layer or that of the substrate on which the reflecting layer is formed, a concave curvature, and in the opposite case, i.e. with a higher thermal coefficient of expansion, a convex curvature can thus be initiated.

The membrane to be used according to the invention should be suspended or clamped securely on the radially outer edge in a suitable form, for example with spring elements. A circumferentially acting suspension or clamping can thereby be present. This is however not necessary in every case. For example a suspension or clamping can thus engage on two oppositely situated outer sides and a hollow cylindrical mirror can be formed upon deformation of the membrane.

However an elastically deformable membrane can also be curved discontinuously during deformation. This is possible with suitable structuring of the membrane. For this purpose, structural elements, such as e.g. depressions or raised portions; can be configured on a membrane in a locally defined manner. However structural elements which can be formed from a further different material can also be incorporated in a membrane or applied thereto. Thus specific deformation profiles can be achieved.

Advantageously, at least one element can be present for determining the respective deformation of the membrane, preferably integrated into the latter. This can be a piezoresistive, a capacitive, magnetostrictive, optical, electromagnetic, resistive sensor or a Hall Effect sensor.

Contrary to the illustrations for the subsequent description of embodiments, the possibility also exists that the surface can be reflected on the electromagnetic radiation, is already curved at a normal ambient temperature and the degree or the direction of the curvature can then be changed specifically by heating.

The invention is intended to be explained subsequently in more detail by way of example.

DETAILED DESCRIPTION OF THE INVENTION

Figure 1:
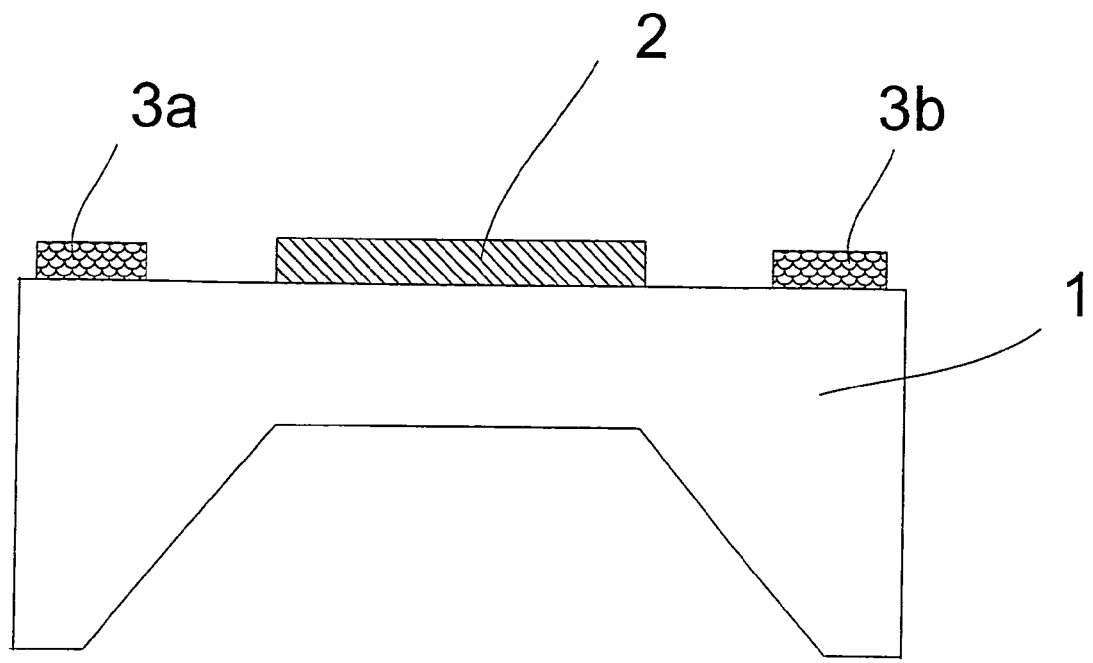
FIG. 1 a first example of a component according to the invention in which the deformable membrane is formed with reflecting layer and a region of a substrate.

FIG. 1 shows the cross-section of a component produced in microsystem technology. The substrate 1, which comprises silicon, was machined from the rear such that a membrane is formed. The bimorph properties are achieved by deposition of the reflecting layer 2. The contact points 3a, 3b are disposed on both sides. Upon applying an electrical voltage between these contact points 3a, 3b, an electrical current flows via them through the substrate 1 and heats the membrane. As a result of the occurring increase in temperature, the curvature of the membrane changes.

Figure 2:
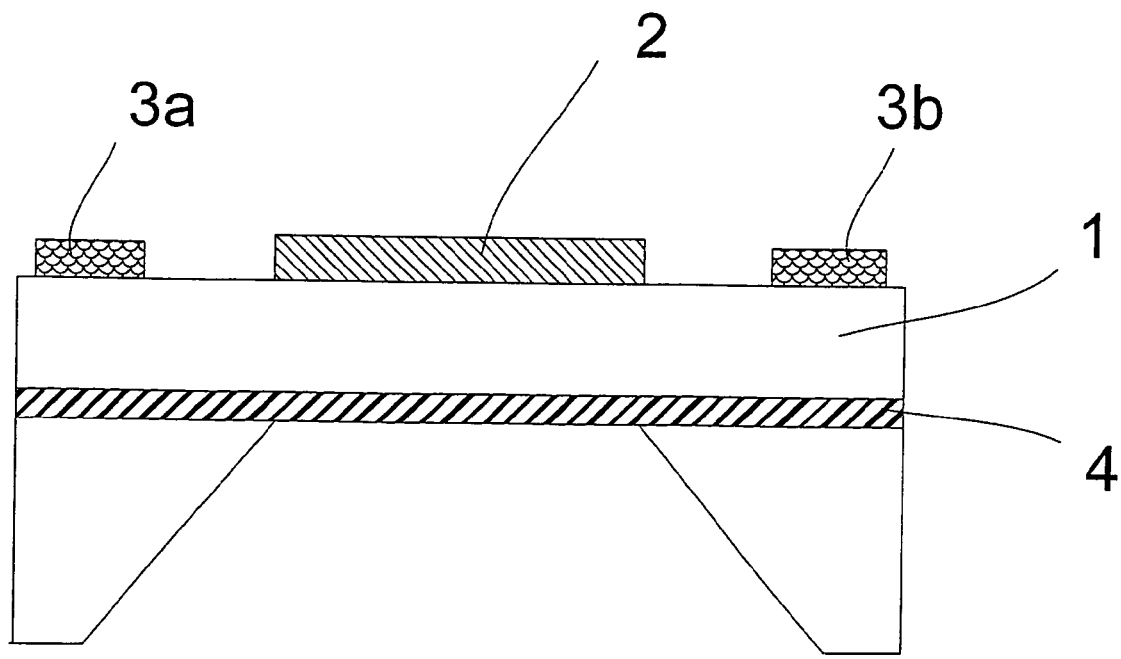
FIG. 2 a second example of a component according to the invention, in which an additional insulating intermediate layer is present.

FIG. 2 shows the same construction in principle but here the substrate 1 is separated by an electrically and thermally insulating intermediate layer 4. The intermediate layer 4 serves, on the one hand, during production of the component as an etching stop and, on the other hand, the heat conduction from the membrane to the separated substrate region is consequently reduced. In addition, the use of this third layer—in addition to substrate 1 and layer 2—offers an additional degree of freedom for the thermomechanical properties of the membrane.

Figure 3:
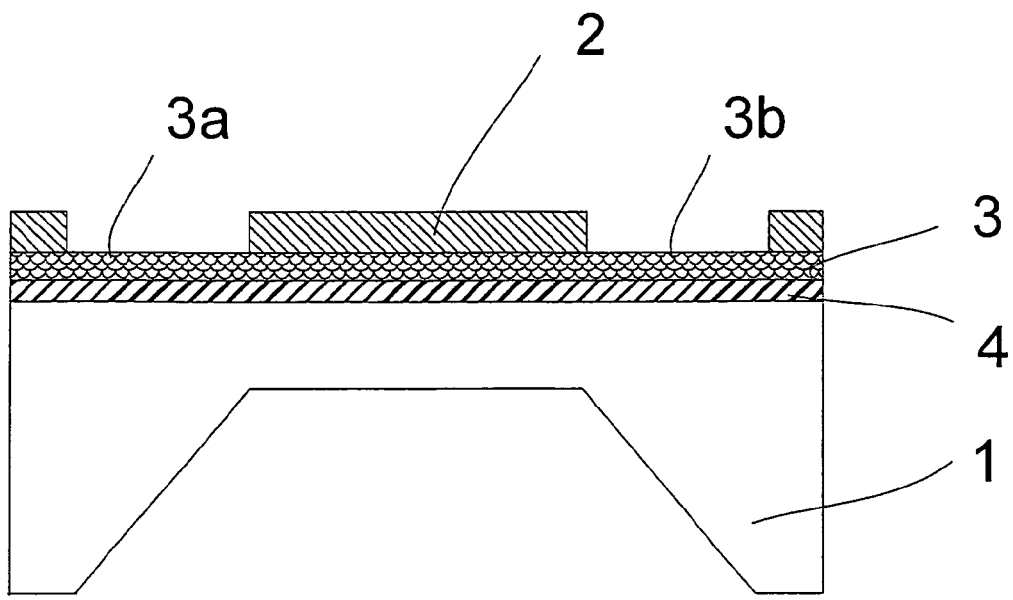
FIG. 3 a third example of a component according to the invention, in which an additional electrically conducting layer is present.

FIG. 3 in turn shows the cross-section of a component produced by microsystem technology, in which an electrically insulating intermediate layer 4 and thereon an electrically conducting layer 3 is applied on the substrate 1. The conducting layer 3 is thereby used firstly as heating element and also for contacting the electrical supply lines (contact points 3a and 3b) via the openings in the layer 2.

The electrically insulating intermediate layer 4 is configured here such that a significant thermal insulation also occurs between the electrically conducting layer 3 and the substrate 1. As a result, the thermal capacity of the entire system is reduced, which makes possible, on the one hand, a lower heating power and, on the other hand, higher dynamics.

Figure 4:
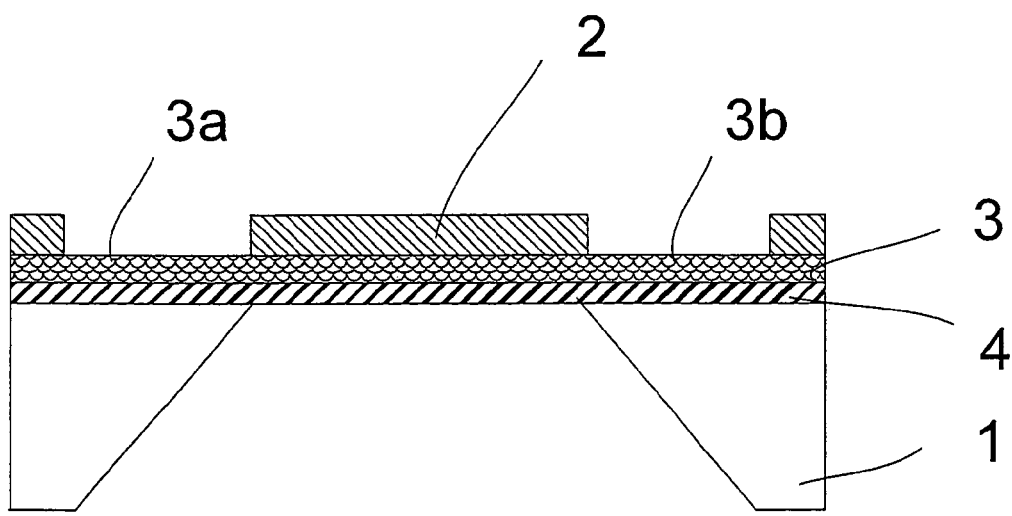
FIG. 4 a fourth example of a component according to the invention, in which an additional electrically conducting layer and an insulating intermediate layer are present.

In FIG. 4, the cross-section of a further embodiment of the component produced by microsystem technology is represented, in which, for further reduction in thermal capacity of the entire system, in the active region of the membrane mirror, the silicon substrate 1 is completely removed. Hence the deflectable part of the membrane is formed from the electrically and thermally insulating layer 4, the electrically conducting layer 3 of the heating element and the optically acting reflecting layer 2, the layers 2 and 3 being able to be identical, which relates to the material or the material mixture from which they are formed.

Figure 5:
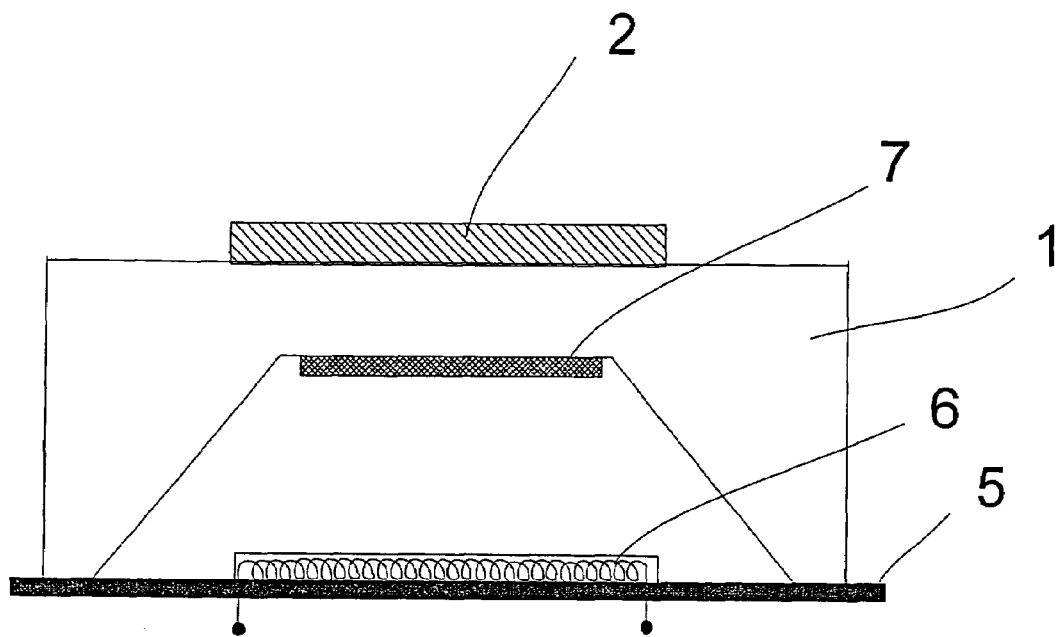
FIG. 5 a fifth example of a component according to the invention, in which an absorption layer is present.

In FIG. 5, the cross-section of a component is shown which has a bimorph membrane which is formed with the substrate 1 and reflecting layer 2. The component is applied on a carrier 5, e.g. a printed circuit board on which a heating element 6 is mounted. The heating element 6 can likewise be integrated in the printed circuit board as a strip conductor system. For efficient heat transfer, an absorber layer 7 is applied on the rear side of the membrane.

Figure 6:
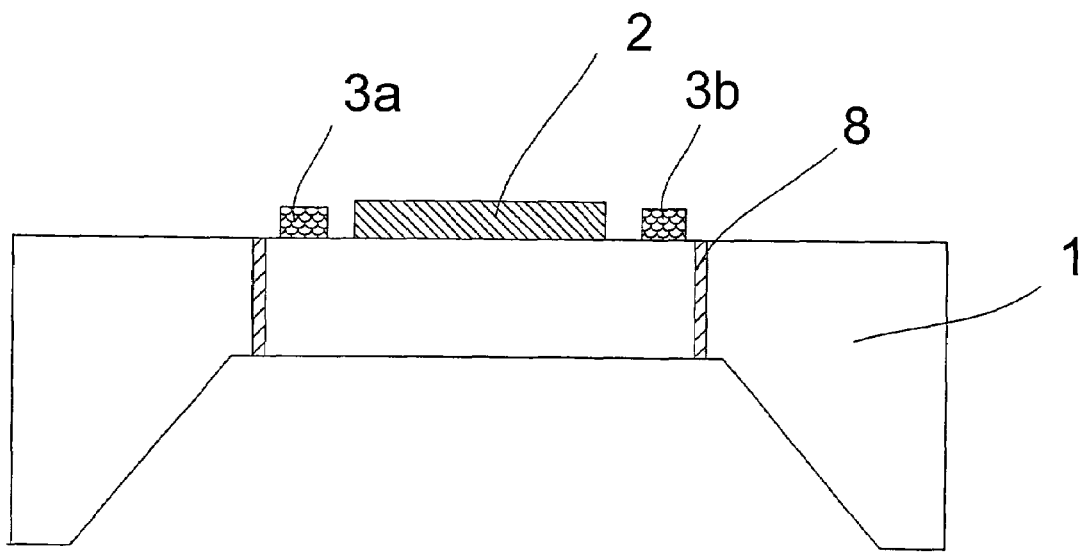
FIG. 6 a sixth example of a component according to the invention with structural elements.

FIG. 6 shows the cross-section of a component in which the inner part of the membrane is separated electrically from the remaining substrate 1 by structures 8 which penetrate the membrane vertically. The bimorph properties are achieved, as in FIG. 1, by the combination with reflecting layer 2. The supply line of the electrical heating current is effected via the contact points 3a and 3b. The current flow between 3a and 3b is effected via the inner part of the substrate 1. The electrically insulating structure 8 also acts in a thermally insulating manner relative to the large part of the substrate 1. Consequently the required heating power, on the one hand, and the thermal capacity, on the other hand, are reduced. If necessary, a further insulating layer can be used in addition to separate the substrate 1 (analogously to FIG. 6).

Figure 7:
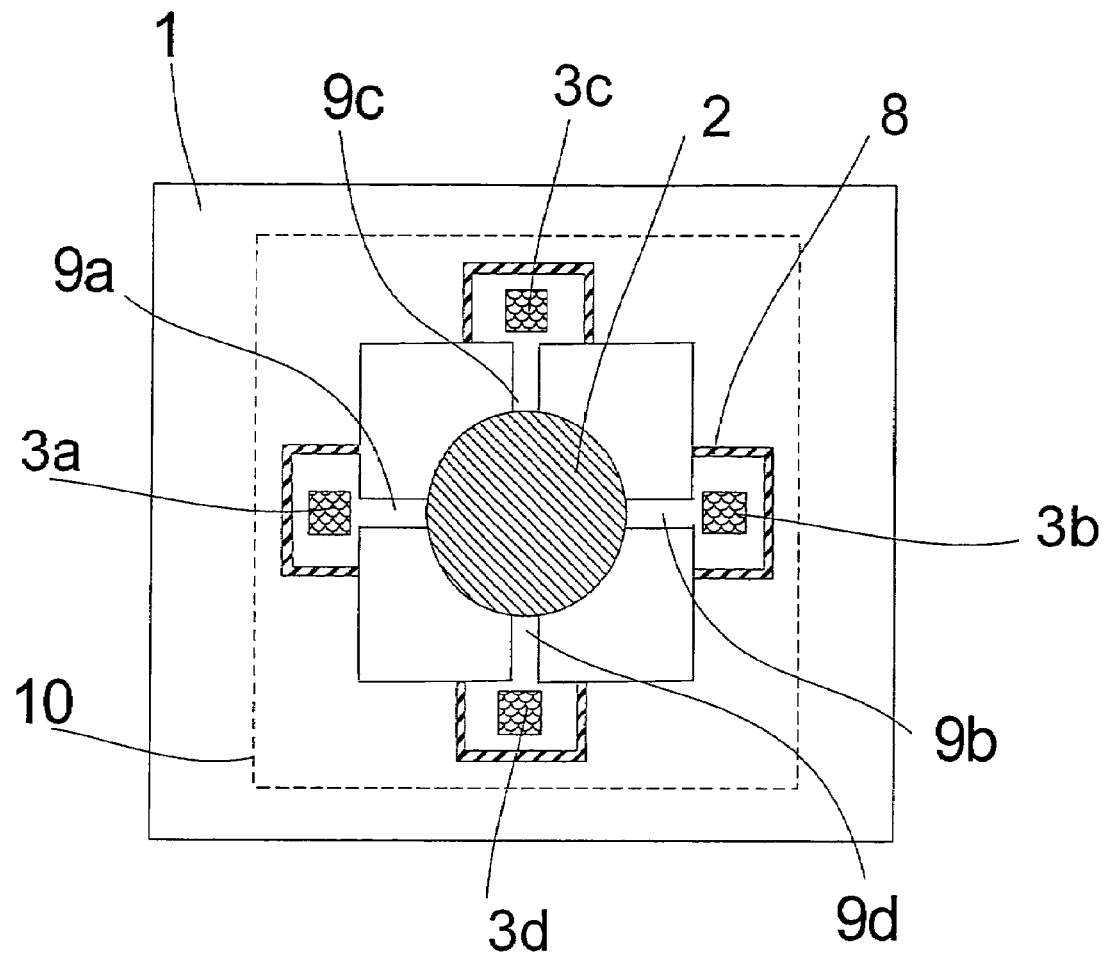
FIG. 7 a seventh example of a component according to the invention with suspensions and structural elements.

FIG. 7 shows a component in plan view. The circular membrane configured as a bimorph is suspended via four arm suspensions 9a-d. Due to the segmented suspension, in comparison to an unstructured membrane, a larger region is deformed in an approximately spherical manner. The electrical contacting is effected via four contact points 3a-d which are connected for example alternately to anode and cathode of a current source. As a result of the current flow, the part of the substrate 1, which is separated in an electrically and thermally insulating manner from the remaining substrate 1 via the vertical insulating structures 8, is heated—see also FIG. 6. The broken line 10 is drawn for clarification and marks the region in which the substrate 1 is structured from the rear side in such a manner that a membrane is formed.

The electrical contact points 3a-d can also be produced outwith the membrane region if the areas within the membrane region are contacted via a supply line. This variant can present advantages for the construction and connection technology. The heat resistors which are produced by the suspensions 9a-d, can also be short circuited, if necessary via additional good thermal conductors (layer/s) on the suspensions 9a-d. As a result, the heat is produced mainly wherever a temperature increase/change is desired.

Figure 8:
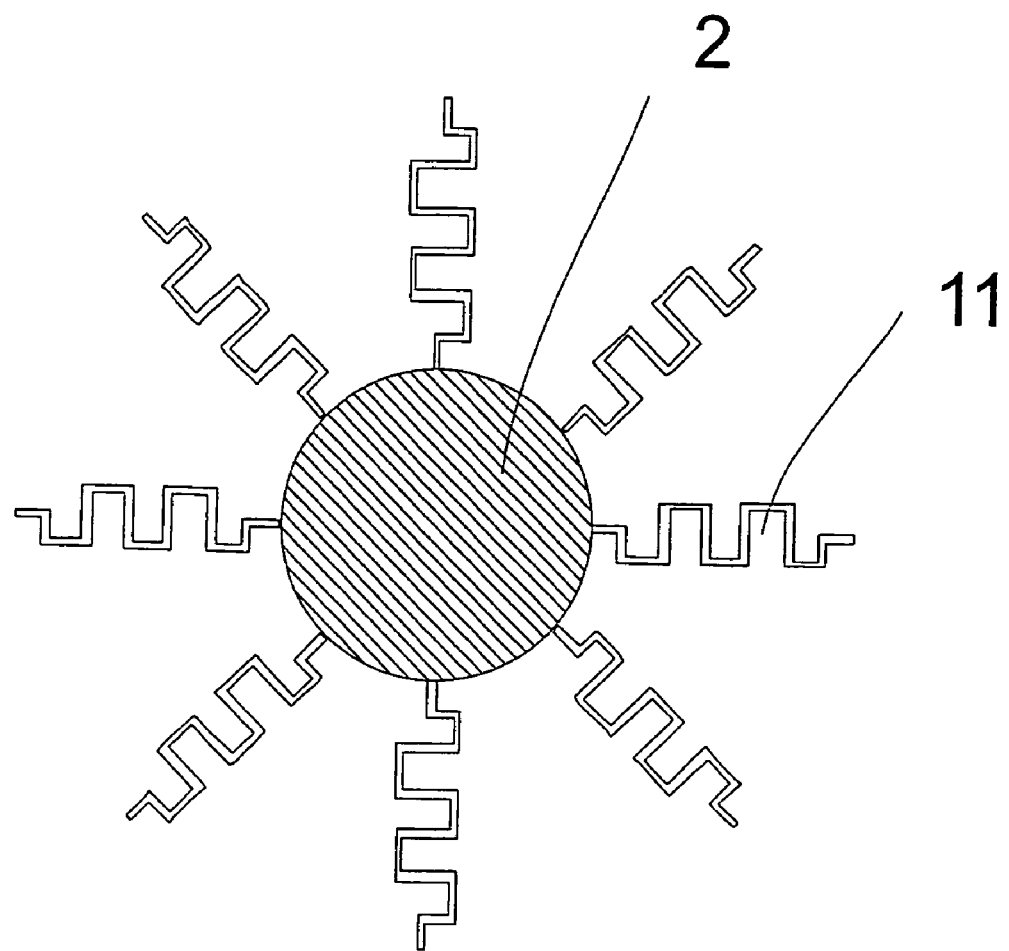
FIG. 8 an eighth example with spring elements.

FIG. 8 shows a special suspension for the inner part of the membrane acting as reflector. The springs 11 are configured such that mechanical tensions—in particular tension and pressure—can be absorbed very well. In total eight such spring elements were used in this example.

In FIGS. 9-12, special variants of the electrical heating mechanism are represented.

Figure 9:
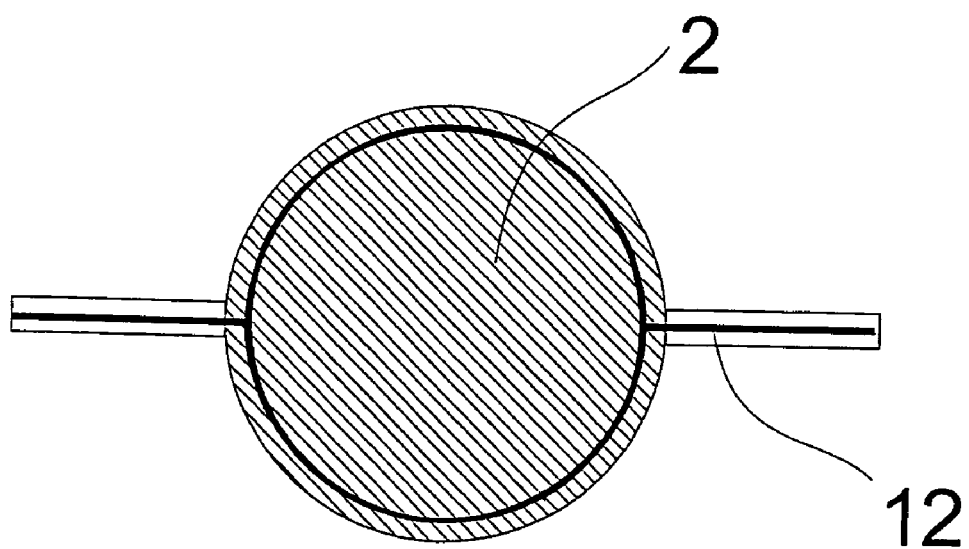
FIG. 9 an example with an annular heat conductor.

In the case of the example shown in FIG. 9, the heat conductor 12 extends firstly from the right via the suspension and forms a circle on the circular bimorph membrane at the outer edge and then extends over the left suspension. The electrical conductor can be applied either on the reflecting layer 2 or extend thereunder. Also the planar integration of the electrical heat conductor 12 into the layer 2 is possible. If necessary a third highly-reflecting layer can be deposited such that a uniform and planar surface is produced for the optical application. Furthermore, the reflecting layer 2 can be electrically insulated from the heat conductor 12 by an additional insulating layer.

Figure 10:
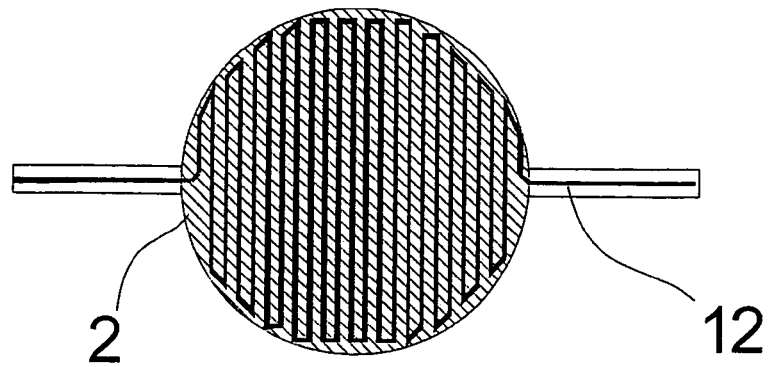
FIG. 10 an example with a meandering heat conductor.
Figure 11:
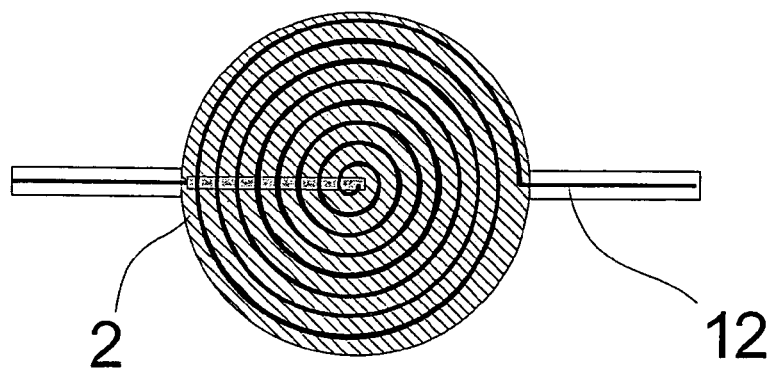
FIG. 11 an example with a helical heat conductor.

In FIGS. 10 and 11, further variants of the electrical heating are represented, in which homogenisation of the temperature distribution can be achieved by suitable structuring of the heat conductor 12 and, as a result, a more uniform spherical curvature of the membrane. Temperature homogenisation, e.g. by means of a meandering (see FIG. 10) or helical (see FIG. 11) structuring, can thus be achieved in coil form of the heat conductor 12. In order to avoid ari electrical short circuit of the heat conductor 12, the latter should preferably be separated from the reflecting layer 2 by an additional insulating layer.

Figure 12:
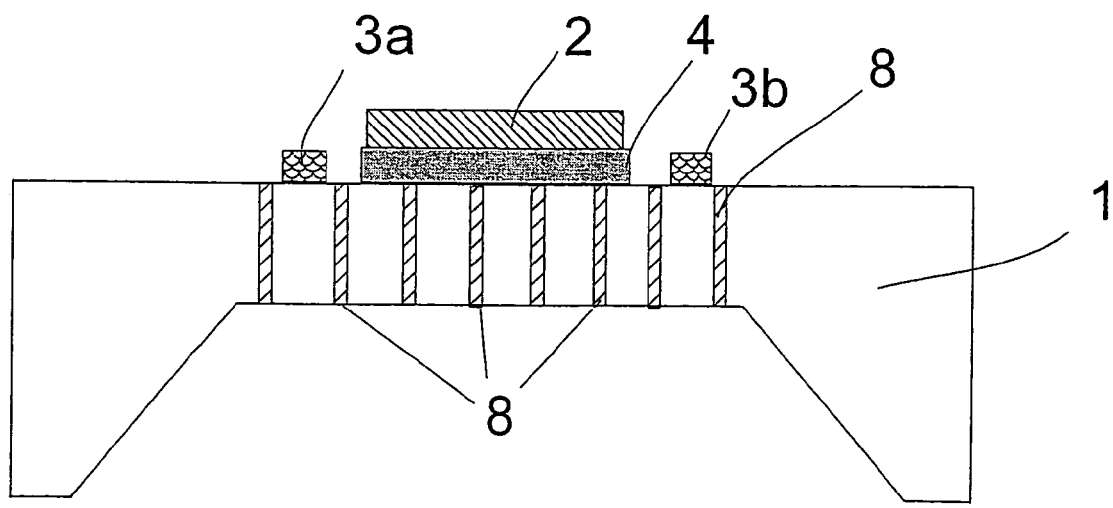
FIG. 12 an example with an insulating intermediate layer and structural elements on a heatable substrate.

In FIG. 12, the cross-section of a microoptic component with a further variant of the electrical heating mechanism is represented, in which the electrical heating element is formed by a specially designed silicon membrane. In order to ensure an advantageous homogeneous temperature distribution, the heating element formed from the silicon membrane is correspondingly structured, vertical insulating structural elements 8 being used for lateral insulation of adjacent regions of the heat conductor 12. In order to avoid an electrical short circuit of the heating element, the latter is separated from the reflecting layer 2 by an electrically insulating intermediate layer 4.

Furthermore a defined surface profile of the membrane which deviates from simple spherical geometries can be achieved by a suitable shape and specific arrangement of the heating element in the active region of the membrane in order to produce a defined local temperature and deformation distribution of the membrane. The heating element can thereby be produced also from a plurality of locally separated and separately controllable heat conductors, e.g. as an array structure. In addition to the heating element 12, one or more temperature sensors for measuring the temporal and local membrane temperature can be integrated on the membrane. With the help of measurement and control of the membrane temperature, the deflection of the membrane can be controlled.

Figure 13:
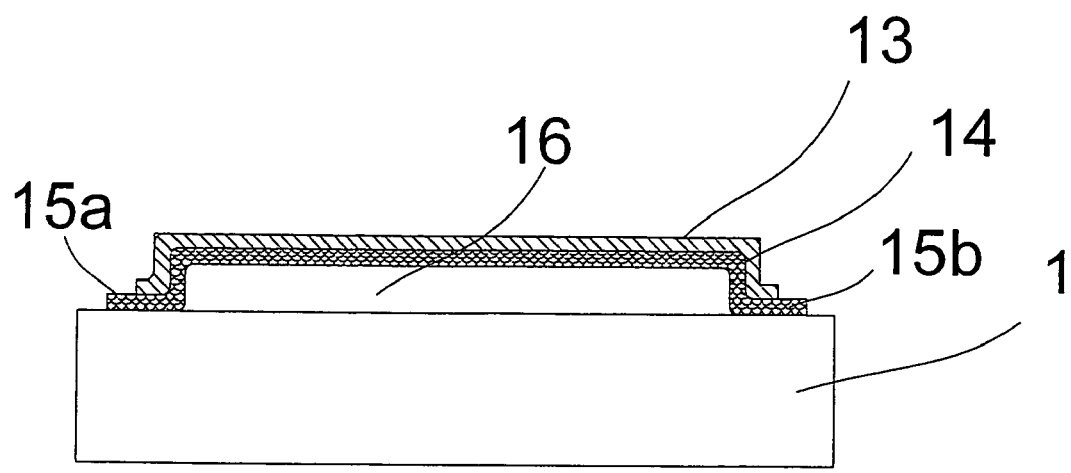
FIGS. 13 and 14 examples with a cavity underneath the deformable membrane.

FIG. 13 shows the cross-section of a component which was produced by surface micromechanics. A bimorph membrane comprising the two layers 13 and 14 is applied on the substrate 1 and in fact in such a manner that a cavity 16 is produced below the central part of these layers 13 and 14. This can be achieved technologically e.g. by means of a sacrificial layer. The electrically conducting layer 14, which acts as electrical heating, and the layer 13 are structured such that the contact points 15a and 15b are produced. If a large region of the curvature is required for the concrete application, then it must be ensured that the cavity 16 is sufficiently large. As an alternative, the bimorph membrane can also be chosen such that a convex hollow mirror is produced upon temperature increase.

In order to increase the heat efficiency, a layer which reflects back the radiant heat can be applied on the substrate 1.

In addition to previous embodiments of the component manufactured by microsystem technology, according to FIG. 1 to FIG. 13, in which the deflection of the membrane is effected exclusively by thermal actuation of the bimorph membrane, additional variants of a component can be achieved by combining the principle of the thermal bimorph actuator with further physical operating principles for actuators. By impingement of the thermally pre-deflected bimorph membrane with additional mechanical forces or moments, which are produced via a further actuator principle, a greater deflection of the membrane can be achieved. Furthermore, by means of a targeted local introduction of these additional forces or moments introduced into the mirror membrane, a defined deformation profile of a higher order of the membrane can be adjusted. As additional drive principles, in particular the electrostatic, the magnetic and the piezoelectric operating principle are suitable.

Figure 14:
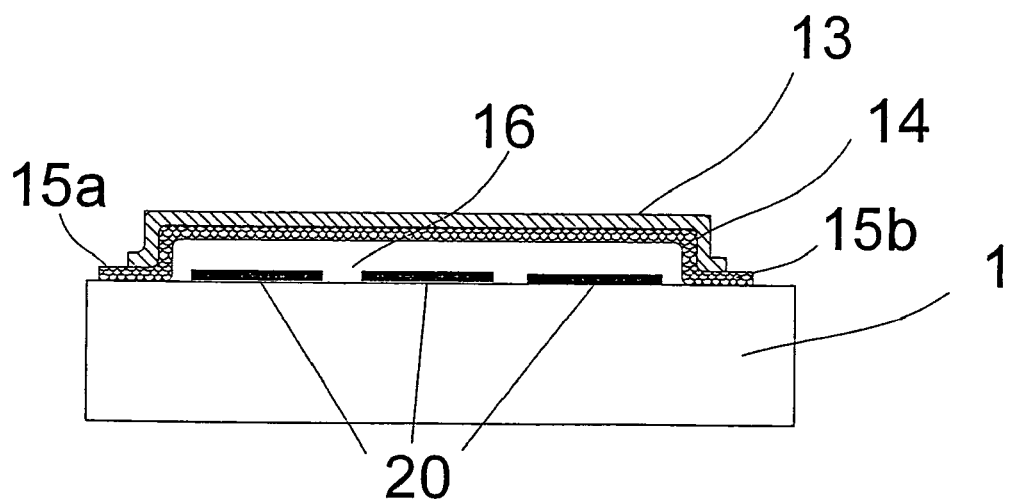

In FIG. 14, an embodiment of a component manufactured by surface micromechanics with an additional capacitive drive of the membrane is shown. The bimorph membrane formed with the two layers 13 and 14 is applied on the substrate 1 such that a cavity 16 is produced under the central part of these layers 13 and 14. In the cavity 16, an electrode structure 20 is disposed on the substrate 1 below the thermally actuatable bimorph membrane, the electrode structure 20 with the electrically conductive layer 14 forming an electrical capacitance. If an electrical voltage is applied between the electrode structure 20 and the layer 14, then an electrostatic force acts on the bimorph membrane and makes an additional contribution to the curvature of the membrane. If the electrode 20 is structured in addition (e.g. as a honeycomb or annular electrode array), each individual electrode being individually actuatable electrically, then local deformation profiles of a higher order of the membrane can be achieved.

Figure 15:
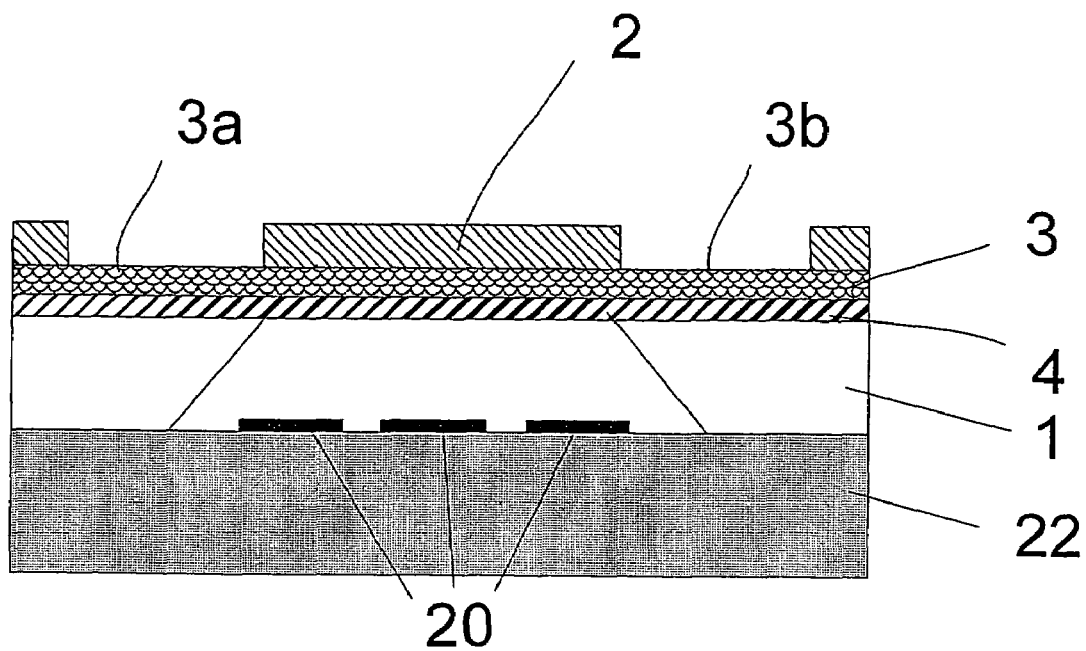
FIGS. 15 and 16 examples with additional elements which have an active effect for deformation of the membrane and FIG. 17 an example with an additional reflecting layer mounted on the deformable membrane by means of a strut.

In FIG. 15, the cross-section of a further embodiment of a component manufactured by microsystem technology is represented with an additional capacitive drive of the membrane. Membrane with substrate 1 are disposed on an additional carrier substrate 22. The carrier substrate 22, analogously to the example according to FIG. 14, thereby has an electrode arrangement 20, via which an additional actuation of the thermally curved bimorph membrane can be effected.

Figure 16:
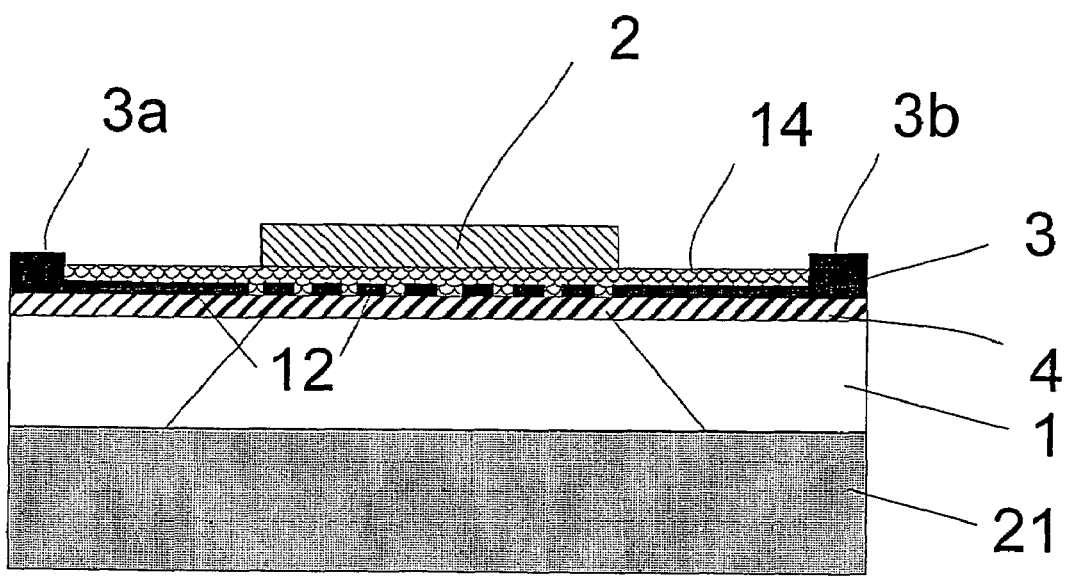

In FIG. 16, an embodiment with a thermally actuated bimorph membrane with additional magnetic drive of the membrane is represented. In the latter, the membrane mirror component is disposed on a magnet 21 (permanent or electromagnet). The heating element 12 of the membrane has a coil-like design (see FIG. 11). The supply of the electrical heating current is effected via the contact points 3a and 3b. The current flow between 3a and 3b, on the one hand, causes heating of the bimorph membrane which becomes curved as a result of the different thermal coefficients of expansion of the membrane layers. In addition to thermal actuation, an electromagnetic-induced deflection of the membrane is effected, since the electrical current flowing in the coil-like heat conductor 12 interacts with the magnetic field produced by the magnet 21 so that the Lorenz force acts on the membrane as a further force component and deflects the same.

In addition to the previously discussed application of the component for focusing or defocusing, the principle of the thermally actuated bimorph membrane can also be used for modulation of an optical path length, e.g. for correction of an optical wave front or for confocal systems.

Figure 17:
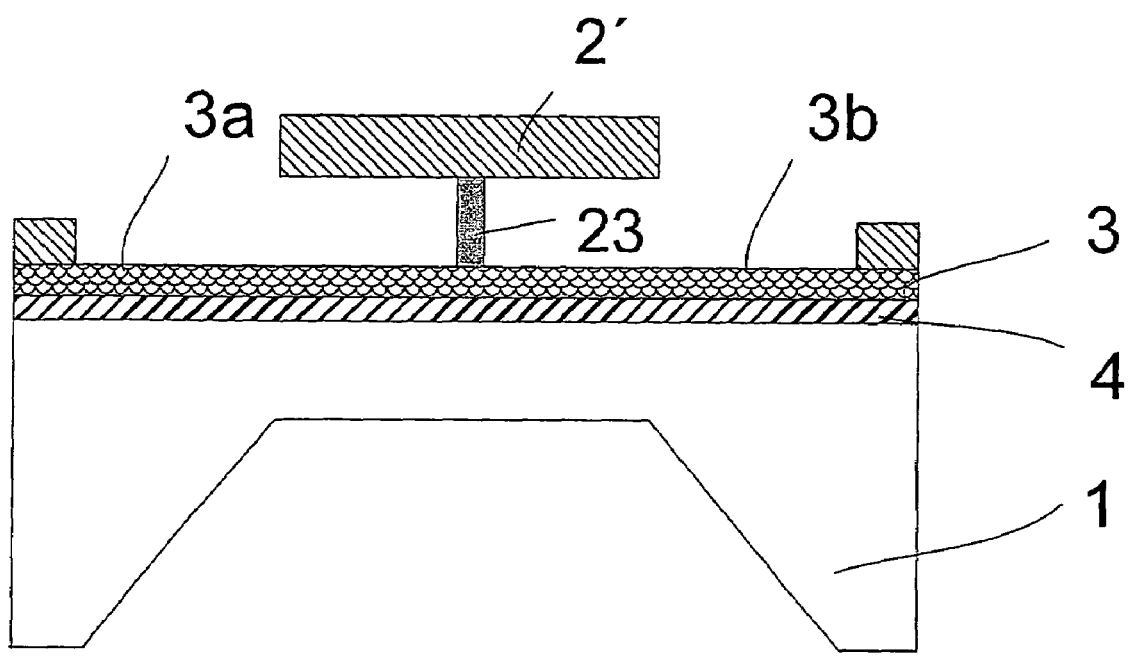

In FIG. 17, an embodiment of a modified component for optical wavelength modulation is represented. Above the thermally actuated bimorph membrane, the optically effective layer 2' is disposed as a spatially separated part of the component. The layer 2' is thereby connected mechanically via a strut 23 to the thermally deflected bimorph membrane. The strut 23 is thereby disposed in the centre of the bimorph membrane so that, upon curvature of the bimorph membrane, a purely translatory movement of the layer 2' is effected which effects a change in the optical path length. A modified component for wave front correction (see FIG. 17) can be combined with other actuator operating principles analogously to FIG. 14 to FIG. 16.

Furthermore, a plurality of individual components can be disposed in an array structure. A monolithic, i.e. integrated array arrangement of a plurality of elastically deformable membranes, and also a hybrid array arrangement, comprising a multiplicity of discrete components, is hereby possible.

The invention claimed is:

1. Microoptic reflecting component with variable focal distance comprising an elastically deformable membrane formed from at least one layer which reflects electromagnetic radiation, said one layer comprising a first material or material mixture and at least one further layer or substrate comprising a second material or material mixture; said first and second material or material mixtures each having thermal coefficients of expansion which deviate from each other; and a heating or temperature control mechanism for applying heat to said membrane.

2. Component according to claim 1, wherein said membrane is formed from at least three layers (2, 3, 4, 7, 13, 14) or at least two layers (2, 3, 4, 7, 13, 14) and said substrate (1).

3. Component according to claim 1, wherein said membrane includes an outer edge and is retained or clamped on said outer edge through a suspension (9a-d, 11).

4. Component according to claim 1, wherein said heating mechanism (12) is configured as an electrical resistance heating mechanism.

5. Component according to claim 1, wherein said heating mechanism (12) is integrated into the membrane.

6. Component according to claim 1, further comprising at least one temperature sensor for temperature control.

7. Component according to claim 1, further comprising an integrated element for determining the deformation of the membrane.

8. Component according to claim 7, wherein said integrated element is one of a piezoresistive sensor, capacitive sensor, magnetostrictive sensor, optical sensor, electromagnetic sensor, resistive sensor or Hall Effect sensor.

9. Component according to claim 1, wherein said membrane further comprises an insulating layer (4).

10. Component according to claim 1, comprising a heating element (6) and/or an absorbing layer (5) disposed on one side of the membrane which is situated opposite the reflecting layer (2).

11. Component according to claim 1, wherein said heating or temperature control mechanism applies heat to the membrane by heat radiation which is directed onto the membrane.

12. Component according to claim 1, in that further elements (20, 21) which are usable for elastic deformation of the membrane are disposed on one side of the membrane.

13. Component according to claim 10, comprising contacts (20), magnets (21) or electromagnets disposed as elements.

14. Component according to claim 1, comprising an element (2'), which is provided with a surface which reflects electromagnetic radiation, connected by a strut (22) to the membrane.

15. Component according to claim 1, comprising structural elements (8) configured in a locally defined manner on or attached to the membrane.

16. Component according to claim 1, wherein said membrane is suspended or clamped on two outer sides which are situated diametrically opposite each other.

17. Component according to claim 1, comprising a plurality of deformable membranes, with which a variation in focal distance of a plurality of beams of electromagnetic radiation can be achieved.

18. Use of a component according to claim 1, in confocal microscopes, in systems for detecting barcodes or 2D codes, in adaptive optical systems, for focus tracking in CD/DVD read/write appliances.

* * * * *